United States Patent
Chekroun et al.

(10) Patent No.: US 10,641,889 B2
(45) Date of Patent: May 5, 2020

(54) DEVICE FOR DETECTING OBJECTS BORNE BY AN INDIVIDUAL

(71) Applicant: SWS SAS, Gif-sur-Yvette (FR)

(72) Inventors: Claude Chekroun, Gif sur Yvette (FR); Gilles Chekroun, Gif sur Yvette (FR)

(73) Assignee: SWS SAS, Gif-sur-Yvette (FR)

(*) Notice: Subject to any disclaimer, the term of this patent is extended or adjusted under 35 U.S.C. 154(b) by 0 days.

(21) Appl. No.: 15/438,568

(22) Filed: Feb. 21, 2017

(65) Prior Publication Data
US 2017/0242119 A1   Aug. 24, 2017

(30) Foreign Application Priority Data

Feb. 24, 2016 (FR) .................................. 16 51492

(51) Int. Cl.
| | |
|---|---|
| G01S 13/88 | (2006.01) |
| G01S 13/86 | (2006.01) |
| G01S 13/90 | (2006.01) |
| G01S 7/03 | (2006.01) |
| G01S 13/00 | (2006.01) |
| H01Q 1/42 | (2006.01) |

(52) U.S. Cl.
CPC .............. G01S 13/887 (2013.01); G01S 7/03 (2013.01); G01S 13/003 (2013.01);
(Continued)

(58) Field of Classification Search
CPC ........... G01S 13/887–888; G01S 13/87; G01S 13/426; G01S 7/03; G01S 13/9035;
(Continued)

(56) References Cited

U.S. PATENT DOCUMENTS

| | | | | | |
|---|---|---|---|---|---|
| 2,670,436 | A | * | 2/1954 | Dunbar | H01Q 3/14 343/761 |
| 2,694,147 | A | * | 11/1954 | Feldman | H01Q 3/01 343/761 |

(Continued)

FOREIGN PATENT DOCUMENTS

| | | |
|---|---|---|
| FR | 2 855 642 A1 | 12/2004 |
| FR | 3 003 959 A1 | 10/2014 |
| WO | 2015/059132 A2 | 4/2015 |

OTHER PUBLICATIONS

J. Darricau: "Physique et Theorie du Radar," Tome 3, Concepts de Traitement du Signal, 3rd edition, Chapter 21, pp. 483, Paris 1994.

*Primary Examiner* — Matthew M Barker
(74) *Attorney, Agent, or Firm* — Baker & Hostetler LLP

(57) ABSTRACT

A device comprises at least: one rotary antenna including at least two parallel rectilinear waveguides; a radar emitting a continuous-wave microwave signal towards the emission guide of the antenna and receiving the signals from the guides of the antenna, which signals are captured by the movable beam, the received signals are the direct component I and the quadrature component; a stereoscopic video camera oriented in the same direction as the movable beam of the rotary antenna and able to record the clothing envelope of the individual, the envelope serving as a reference surface for the measurement of distances to the device; a processor that computes an SAR image of that portion of the body of the individual targeted by the radar and the video camera and who is possibly equipped with one or more objects, from signals received from the radar and the distances measured by the video camera.

10 Claims, 12 Drawing Sheets

(52) U.S. Cl.
CPC ............ *G01S 13/867* (2013.01); *G01S 13/90* (2013.01); *H01Q 1/42* (2013.01)

(58) Field of Classification Search
CPC .................. G01S 13/003; G01S 13/867; G01S 13/90–9094; H01Q 13/18; H01Q 13/22; H01Q 3/12; H01Q 1/525; H01Q 5/40; H01Q 13/12; H01Q 25/00; H01Q 1/42
See application file for complete search history.

(56) References Cited

U.S. PATENT DOCUMENTS

| | | | |
|---|---|---|---|
| 2,711,440 A * | 6/1955 | Rines ........................ | G01S 1/02 315/5 |
| 6,894,636 B2 * | 5/2005 | Anderton ............... | G01V 8/005 342/179 |
| 8,319,678 B2 * | 11/2012 | Weiss .................... | G01S 13/003 342/175 |
| 8,400,512 B2 * | 3/2013 | Koch .................... | G01S 7/4802 348/164 |
| 8,670,021 B2 * | 3/2014 | Kuznetsov ............ | G01S 13/867 348/43 |
| 8,692,708 B2 * | 4/2014 | Nogueira-Nine .... | G01K 11/006 250/334 |
| 9,029,778 B1 * | 5/2015 | Boyd ........................ | G01J 3/42 250/341.1 |
| 9,304,190 B2 * | 4/2016 | Kuznetsov ............ | G01V 8/005 |
| 2006/0164286 A1 * | 7/2006 | Nikulin .................. | G01S 13/89 342/22 |
| 2016/0025852 A1 | 1/2016 | Chekroun et al. | |
| 2016/0223664 A1 * | 8/2016 | Colantonio ............... | B64C 1/36 |

\* cited by examiner

DEVICE FOR DETECTING OBJECTS BORNE BY AN INDIVIDUAL

CROSS-REFERENCE TO RELATED APPLICATIONS

This application claims priority to foreign French patent application No. FR 1651492, filed on Feb. 24, 2016, the disclosure of which is incorporated by reference in its entirety.

FIELD OF THE INVENTION

The present invention relates to a device for detecting objects borne by an immobile or moving individual, these objects possibly being illicit objects hidden under clothes.

BACKGROUND

The surveillance of people in public spaces has become necessary for public security. There is an increasing need to inspect what individuals are carrying. There is a real need to detect explosives, weapons or even drugs on the street. On trains, it is in particular necessary to detect explosives or weapons. In stadia, in addition to these dangerous objects, it is useful to detect glass bottles or drugs in particular.

Present-day inspection solutions are unsatisfactory. Security forces have at their disposal:
  Metal detectors, which of course cannot detect non-metallic objects such as explosives;
  X-ray devices, which are usable for baggage for example, but not in open zones for public-health reasons;
  Permission to stop and search, but such interventions are slow and may be contested.

SUMMARY OF THE INVENTION

One aim of the invention is to overcome these drawbacks and to allow illicit objects borne by immobile or moving individuals to be detected simply and rapidly. To this end, the subject of the invention is a device for detecting objects borne by immobile or moving individuals, said device including at least:
  at least one rotary antenna including at least two parallel rectilinear waveguides and a cylinder provided with a helicoidal slot rotatably movable about said guides, which guides are open facing the interior face of said movable cylinder, said surface forming a microwave short-circuit in order to close said guides, one of said guides being dedicated to emission, a movable radiating source being located facing said guides subsequent to the rotational movement of said cylinder inducing a movable emission and reception beam able to be oriented towards an individual;
  one radar emitting a continuous wave (CW) microwave signal towards the emission guide of said antenna and receiving the signals received from the guides of said antenna, which signals are captured by said movable beam, said received signals being the direct component I and the quadrature component;
  one stereoscopic video camera that is oriented in the same direction as said movable beam and able to record the clothing envelope of said individual, said envelope serving as a reference surface for the measurement of distances to said device;
  one processor that computes an SAR image of that portion of the body of said individual which is targeted by said radar and said video camera and who is possibly equipped with one or more objects, from signals received from said radar and the distances measured by said video camera.

In one particular embodiment, the two guides are etched into a cylinder placed in the interior of the movable cylinder, the two cylinders having the same axis, and the space between the 2 cylinders is equal to 0.1 mm±0.05 mm.

Said rotary antenna for example includes a system for minimizing microwave leaks, said system being composed of three cavities, said cavities being arranged pairwise on each side of said waveguides, parallelly thereto, over all their length.

Said waveguides being etched into a cylinder placed in the interior of the movable cylinder, said movable cylinder and said interior cylinder are for example rotatably movable by way of a ball bearing device, the base of said movable cylinder and the base of said interior cylinder being mechanically secured to the movable portion and the stationary portion of said device, respectively.

Said radar for example operates in a millimetre-wave frequency band.

In one possible embodiment, said device includes two rotary antennae so that said radar may operate in a bi-static mode, one antenna realising the emission and the other antenna being dedicated to the reception.

In this possible embodiment, the antennae are for example connected together by two waveguides, one guide connecting the emission guides of said antennae and the other guide connecting the reception guides, the first waveguide being connected via a magic T to a waveguide that is connected to the radar and the second waveguide being connected via another magic T to a waveguide that is connected to the radar.

Said radar for example emits at a number N of frequencies close to a given frequency, the emission pulse being divided into N portions, each portion corresponding to one frequency, a first level of analysis of the image being performed for the signals received at the first of said frequencies, other analyses being performed for the signals received at the other frequencies, the various analyses allowing the theoretical value of the dielectric permittivity of a detected object to be approached.

The processor is for example an integral part of the processing means of said radar.

Said device including means for viewing the obtained images, said viewing means are for example glasses worn by a user and onto which said images are projected.

The antennal portion, the radar and their interconnecting means are placed in the interior of a portable cylindrical structure that also plays the role of a radome, said structure supporting said video camera.

BRIEF DESCRIPTION OF THE DRAWINGS

Other features and advantages of the invention will become apparent from the following description, which is given with reference to the appended drawings, which show.

DETAILED DESCRIPTION

Figure 1:
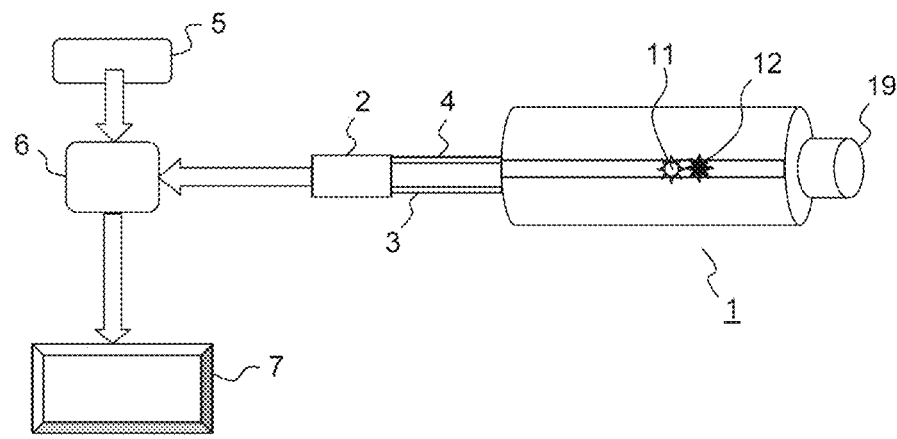
FIG. 1, the main components forming a device according to the invention.

FIG. 1 illustrates the main components forming a device according to the invention. Such a device includes at least:

one rotary device 1 the operation of which will be described below and that will possibly also be referred to as the scanner;

one low-cost continuous-wave (CW) radar 2 for example operating at a central frequency close to 77 GHz in a homodyne reception mode and in particular including a generator for generating emission waves at the central frequency, receiving means and emitting means, the radar 2 delivering a radar image obtained from signals received by the rotary antenna according to the SAR imaging principle, as will be described below;

two waveguides 3, 4 one of which ensures the transmission of microwave-frequency signals from the radar 2 to the antenna 1 and the other of which ensures the transmission from the antenna to the radar;

one stereoscopic video camera 5, for example such as a Kinect; one processor 6 combining the image obtained by the video camera with the image obtained by the radar in order to make it possible to view any detected objects in superposition with the stereoscopic image obtained by the video camera;

one screen 7 or any other viewing means, connected to the processor and displaying the final image.

The various components of the device according to the invention will be described below.

Figure 2A:
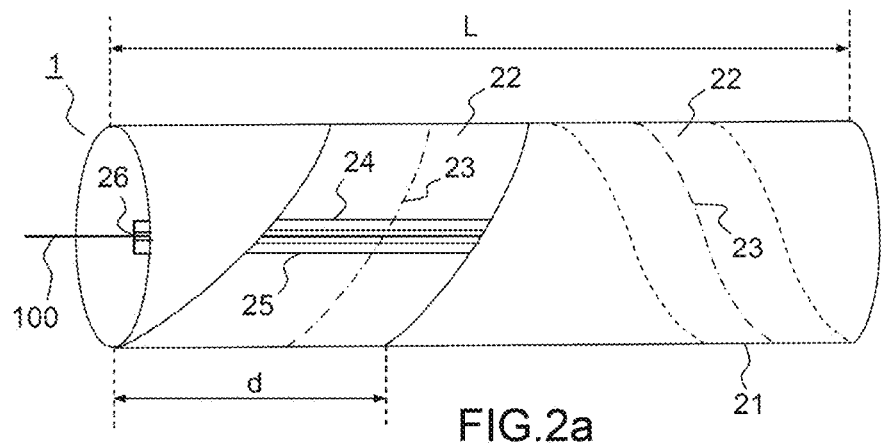
FIGS. 2a and 2b, the operating principle of the rotary antenna used in the device according to the invention.
Figure 2B:
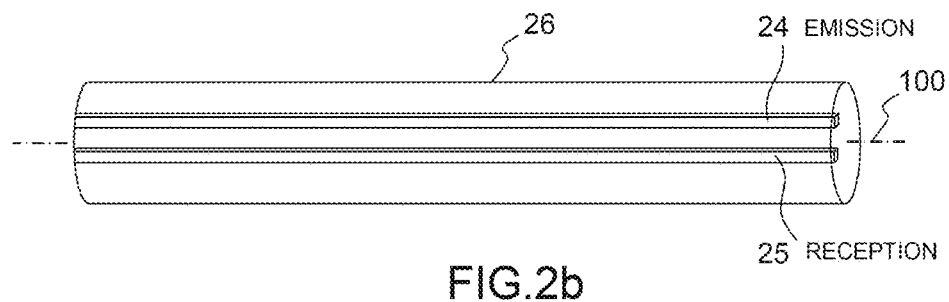

FIGS. 2a and 2b illustrate the possible operating principle of the scanner 1.

FIG. 2 illustrates the operating principle. The antenna 1 includes a metal cylinder 21 having a radiating aperture 22 following a helicoidal line 23 tracing the perimeter of the cylinder. The antenna includes at least one pair of waveguides 24, 25 that are placed in the interior of the cylinder and that are open towards the interior wall of the cylinder. One waveguide 24 is reserved for emission and the other waveguide 25 is reserved for reception. The emission guide 24 is connected to the emitting means of the radar 2 and the reception guide 25 is connected to the receiving means of the radar 2. The cylinder 21 and the waveguides 24, 25 have a relative rotational movement with respect to the axis 100 of the cylinder.

Preferably, the guides remain stationary and the cylinder 21 is driven to rotate about the guides. The guides 24, 25 are placed on a holder 26 placed in the interior of the cylinder 21.

FIG. 2b illustrates an exemplary embodiment of the holder 26 of the waveguides 24, 25. This holder 26, which is placed in the interior of the first cylinder 21, is a cylinder. It forms the stator in the case where the first cylinder 21, the rotor, is driven to rotate. The waveguides 24, 25 are placed on the interior cylinder 26. In one preferred embodiment, the guides 24, 25 are etched into this cylinder 26. Specifically, on account of the potential speed of movement of the individuals to be monitored, which ranges from 0.5 to 3 km/h, to obtain a good sample for the synthetic aperture, at 0.5λ (λ being the microwave wavelength used), the speed of rotation of the rotor must be comprised between 1500 and 3000 revolutions per minute, this precluding any stator asymmetry. This requires a stator with a cylindrical exterior envelope, and therefore the waveguides to be etched into the cylinder.

The antenna 1 includes two guides 24, 25, one for emission and the other for reception, these two separate guides advantageously making it possible to carry out self-calibration in real time. Specifically, any mechanical system operating at speeds of rotation such as the aforementioned requires a system for carrying out calibration in almost real time. This calibration requires various microwave paths in the interior of the device to be measured, which may advantageously be done via the external coupling between the emission produced by the emission guide 24 and the reception on the other guide 25, thus allowing protective actions to be taken against loss of adjustment.

Figure 3:
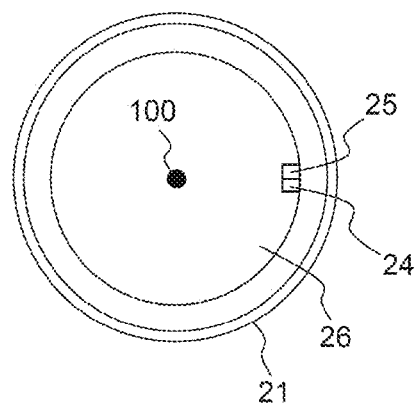
FIG. 3, a transverse view of said antenna.

FIG. 3 shows, via a transverse view, the arrangement of the interior cylinder 26 with respect to the exterior cylinder 21, the two cylinders having the same axis of symmetry 100. The diameter of the interior cylinder 26 is for example defined so that the radiating face of the guides is at a given distance from the exterior cylinder that will be specified below. When the radiating face is facing the interior metallized portion of the cylinder, and not the aperture, this metallized face plays the role of a microwave short-circuit, without however preventing leaks level with the contacts. To prevent these substantial leaks, three slots etched in the interior cylinder are placed along the emission and reception waveguides 24, 25, these slots playing the role of short-circuits allowing the short-circuits to be brought back to the guides. An exemplary embodiment of these slots will be presented with reference to FIGS. 6a and 6b.

The operating principle of the rotary antenna illustrated by FIGS. 2a, 2b and 3 uses a pair of waveguides 24, 25, one for emission and the other for reception. It is possible to provide an embodiment including two pairs of (emission and reception) waveguides. In this case, the second pair is for example radially opposite the first pair 24, 25. The two pairs of guides are then for example connected to the radar 2 via an SP4T switch. Advantageously, such an antenna allows the domain of inspection to be increased.

Figure 4A:
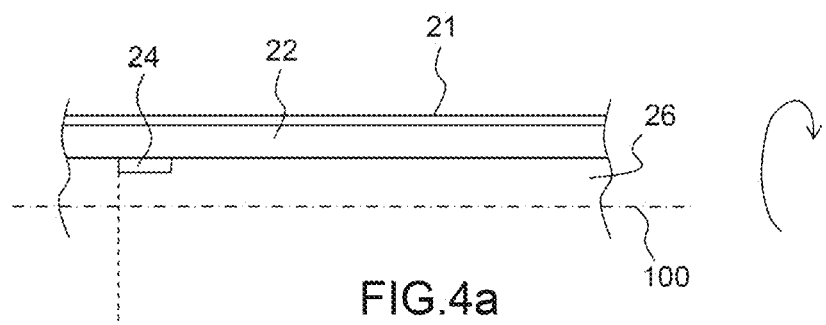
FIGS. 4a to 4e, an illustration of the operation of said antenna.
Figure 4B:
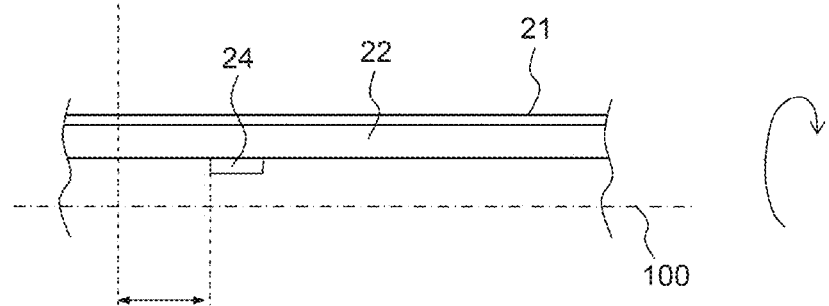
Figure 4C:
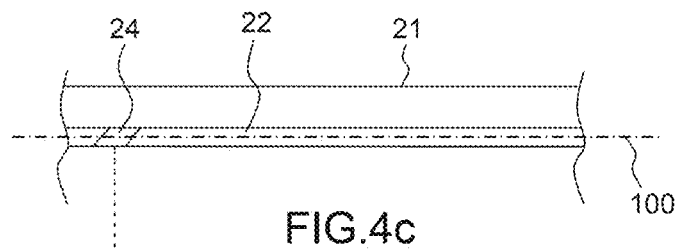
Figure 4D:
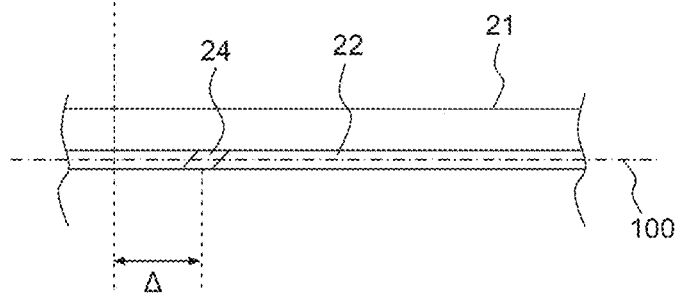

FIGS. 4a, 4b, 4c, 4d and 4e illustrate the operation of an antenna such as described above and more particularly the detecting mode that it enables. FIGS. 4a and 4b show a partial cross-sectional view, along the axis 100, of two relative positions of the cylinders 21, 26. FIGS. 4c and 4d respectively illustrate the relative positions of the two cylinders of the partial views of FIGS. 4a and 4b as viewed from above. These figures show that in the presence of the exterior cylinder 26, the slots 24, 25 form two contactless microwave waveguides, the rotation of the interior cylinder 26 facing the stationary and longitudinally open exterior cylinder forming two moving radiating sources.

To make this effect easier to explain, a single beam corresponding, for example, to that of the emission waveguide 24, will be considered. In operation, the portions of the guide 24 that face the metallized wall of the cylinder 21 do not radiate. The portions of the guide that are facing the aperture 22 contribute to the emission and reception radiation pattern of the antenna. In fact, because of the helicoidal shape of the waveguide 25, which traces a helix, and its rotation with respect to the longitudinal aperture 22 of the stationary cylinder, the guide 24 behaves, facing the aperture, as a sliding guide element making rectilinear reciprocal movements.

Figure 4E:
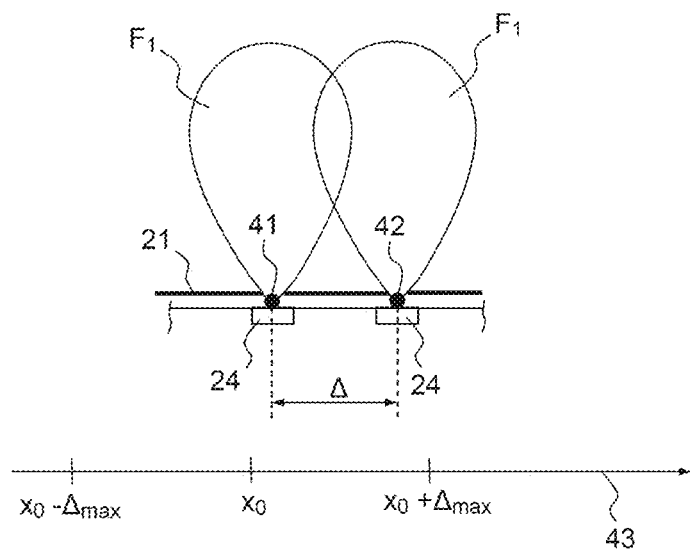

FIG. 4*a* illustrates the position of one portion of the guide 24 facing the radiating aperture at a given time $t_0$. FIG. 4*e* illustrates the antenna beam $F_1$ associated with the position in FIG. 4*a*, with its phase centre 41 located level with the guide portion 24 forming the irradiator or radiation source. The beam $F_1$ here represents the angular coverage of the antenna. FIG. 4*b* illustrates the same elements as those in FIG. 4*a*, but at a subsequent time $t_0+\Delta t$. In the plane of the figure, the portion of the guide 24 forming the radiation source, i.e. the portion facing the aperture 22, is thus shifted a distance $\Delta$ subsequent to the rotation of the interior cylinder 26. The antenna beam $F_1$ corresponding to the position of the interior cylinder 26 in FIG. 4*b* is shown with its phase centre 42 shifted a distance $\Delta$. The rotation of the interior cylinder holding the guide 24 therefore allows the phase centre of the radiation to be continuously moved and therefore the beam $F_1$ to be continuously moved. Along the axis 43 of the longitudinal aperture 22, parallel to the axis 100 of the cylinder, the phase centre moves between a position $x_0-\Delta_{max}/2$ and $x_0+\Delta_{max}/2$. The amplitude of the movement $\Delta_{max}$ depends on the pitch of the helix 23 that the radiating aperture traces. The speed of rotation of the interior cylinder 26 is such that the phase centre 41, 42 moves linearly at a speed that may reach 30 m/s.

The width of the beam $F_1$ depends on the width d of the aperture 22 of the exterior cylinder, i.e. the aperture forming the radiating aperture. The smaller d, the wider the antenna beam. The 3-dB width of the beam $F_1$ is $\lambda/d$, where $\lambda$ is the emitted wavelength. The scanning principle is the same on reception with the reception guide 25.

The rotation of the interior cylinder therefore allows the phase centre of the radiation to be continuously moved, and thus allows a synthetic aperture radar or SAR operating mode to be obtained. This property is used by the processing means of the radar 2 to obtain and analyse high-resolution radar images. It will be recalled that synthetic aperture radar are radar the antenna of which is oriented perpendicularly to the route of the carrier. It is the carrier of the radar, and more particularly of the antenna, that in its movement allows the space to be observed. In the present case, the movement of the carrier is simulated by the movement of the phase centre. The two dimensions of the radar image are defined by the direction of propagation and the movement of the carrier. The spatial resolution, on which the sharpness of the observed image depends, is therefore obtained:

in the direction perpendicular to the movement of the carrier by the distance resolution of the radar;

in the direction of the movement of the carrier by the width of the beam F1.

SAR processing is in particular described in the work by J. Darricau: "*Physique et Théorie du Radar*"—tome 3, $3^{rd}$ edition—chapter 21, page 483—publisher: Sodipe, Paris 1994.

A set of receivers placed along the axis 43 is then obtained over time as in an SAR type application, thus allowing radar images to be produced. Specifically, the shape of an object may be determined from the reflection coefficients measured for each pixel of the image.

In the embodiment described by FIGS. 2*a* and 2*b*, the interior cylinder 26 including the two waveguides 24, 25 remains stationary, the two guides being rectilinear. The rotor 21 contains the helicoidal slot 22, which turns around the guides.

It is possible to provide an embodiment in which the interior cylinder 26 equipped with the waveguide turns, forming the rotor, whereas the helicoidal slot 22 remains stationary.

In another embodiment, the waveguides have a helicoidal shape and the slot rotating around the guides is rectilinear. This rotational movement is relative, i.e. either the slots may be stationary and the movable slot rotate, or in contrast the guides may be rotatably movable while the slot remains stationary.

When the hollow cylinder carrying the slot remains stationary, the latter may play the role of a radome that also prevents the slot from deforming under the effect of the rotation.

Rotating waveguides however require a rotating joint system and a mechanism suitable for exchanging signals with the radar.

In all these embodiments, the operating principle remains that described in FIGS. 4*a* to 4*e*. Below, an embodiment according to FIGS. 2*a* and 2*b* will be considered in which the guides remain stationary.

Figure 5A:
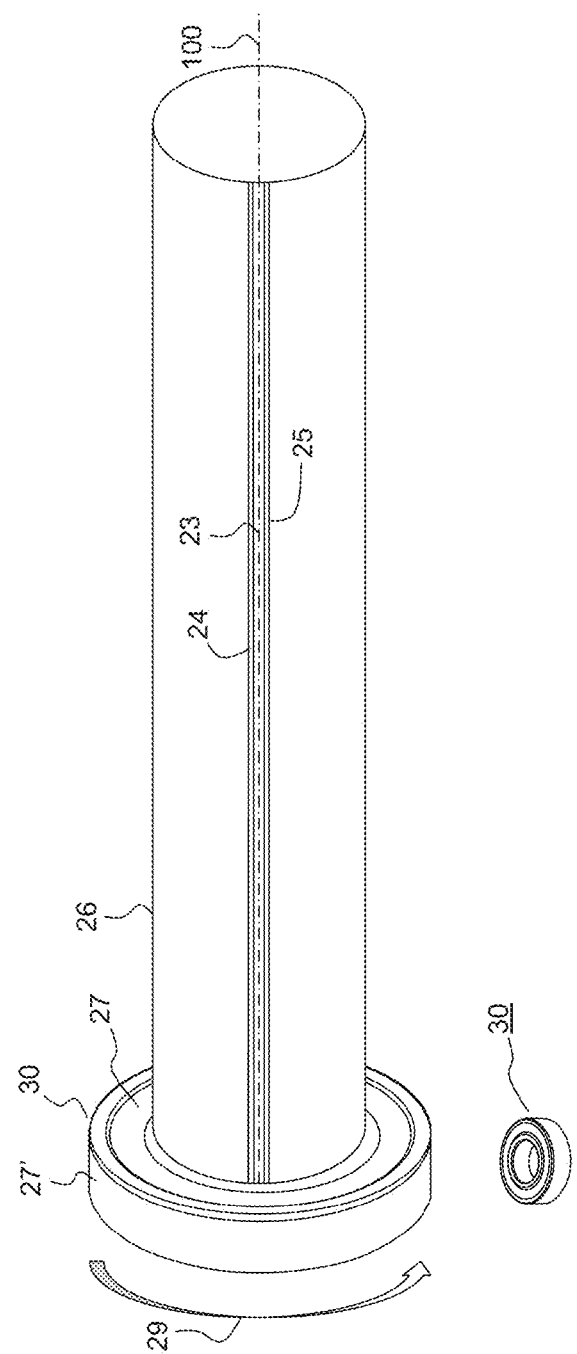
FIGS. 5a and 5b, one exemplary embodiment of said antenna.
Figure 5B:
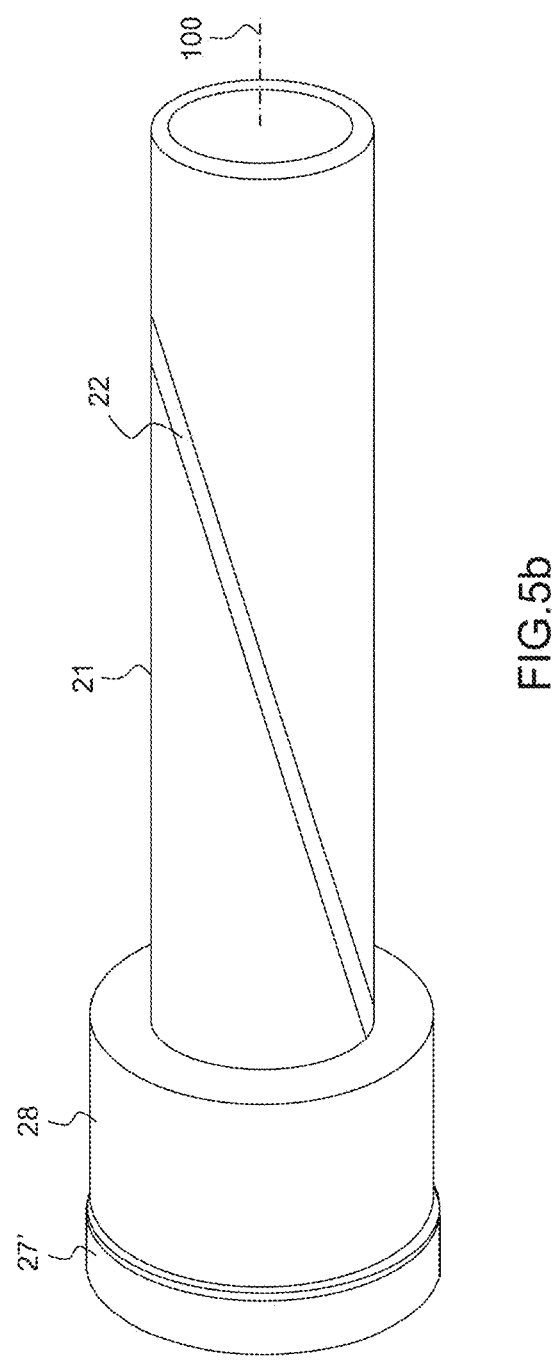

FIGS. 5*a* and 5*b* show an exemplary embodiment according to this embodiment, FIG. 5*a* showing the stationary interior cylinder 26, i.e. the stator, equipped with the two waveguides 24, 25, and FIG. 5*b* showing the exterior cylinder 21, equipped with the helicoidal slot, rotating about the stationary cylinder.

The exterior cylinder 21 is driven to rotate by a motor 19, which is shown in FIG. 1. It slides in rotation with respect to the stationary portion via a cylindrical ball bearing device 30. The stationary portion 27 of the ball bearing is mechanically secured to the base of the interior cylinder 26 and the movable portion 27' of the ball bearing, which may move as indicated by the arrow 29 in FIG. 5*a*, is mechanically secured to a holder 28 that, for example, is of cylindrical shape, this holder itself being mechanically secured to the exterior cylinder 21. The cylindrical holder 28 for example forms a wider-width cylindrical support of the stationary cylinder 21, the holder and cylinder together forming the stator.

The stator and rotor assembly is covered by a protective radome (not shown).

Figure 6A:
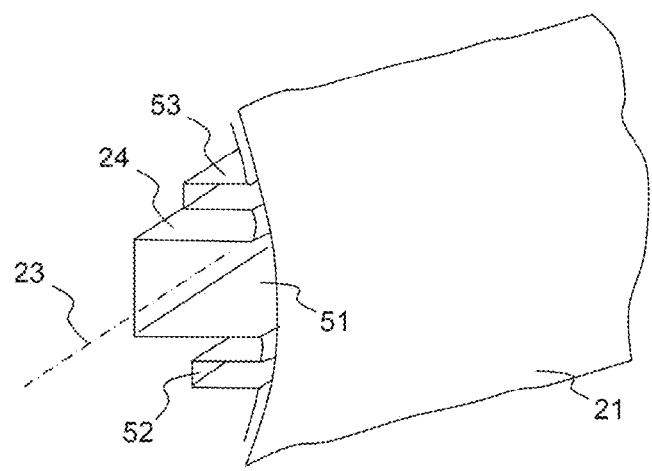
FIGS. 6a and 6b, an exemplary embodiment allowing microwave leaks to be minimized in said antenna.
Figure 6B:
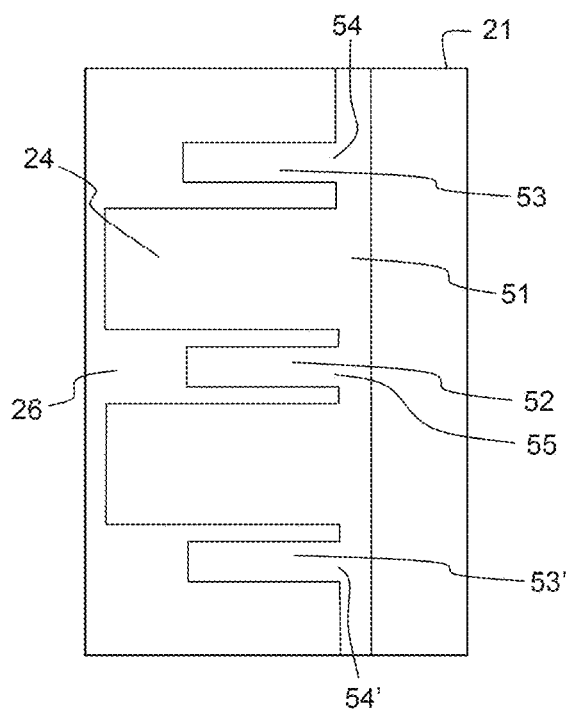

FIGS. 6*a* and 6*b* illustrate a particular embodiment of the guides and their coupling to the exterior cylinder 21 advantageously allowing microwave leaks to be minimized as was mentioned above. FIG. 6*b* is a partial cross-sectional view in which the radius of curvature has not been shown for the sake of simplicity.

FIG. 6*a* shows, via a partial perspective view, an embodiment of a guide; by way of example the emission guide 24 will be considered. The reception guide 25 is produced and coupled in the same way.

The waveguide 24 is a guide of rectangular cross section comprising a radiating aperture 51. The metallized interior face of the exterior cylinder 21 forms a short-circuit in order to close the guide. The effect of the rotation of the guide 24 in the interior of this cylinder 21 is to create a radiating source that moves along its longitudinal aperture 22. The waveguide 24 is connected by one end to the emission circuits of the radar 2, and to other circuits by transmitting means that will be described below. It is connected at its other end to a matched load.

Two parallel cavities 52, 53 are produced on each side of the guide 24, over its entire length. Since these cavities are parallel to the waveguide 24, they also trace the helicoidal line 23.

FIG. 6b shows the two waveguides 24, 25 each surrounded by a cavity. The emission waveguide 24 is surrounded to the left by a cavity 53 and to the right by a cavity 52. The reception waveguide 25 is surrounded to the left by the latter cavity 52, which is common to the two guides, and to the right by a cavity 53'.

The apertures 54, 55, 54' of the cavities are substantially in the plane of the aperture 51 of the guide and more precisely on the same line of curvature. Advantageously, these cavities trap the microwave-frequency waves and very greatly limit, or even suppress, microwave leaks.

These cavities 52, 53, 53' are less wide and less deep than the guide. Their dimensions are for example the following, λ being the emitted wavelength, corresponding to the central frequency:
Depth of a guide 24, 25: 0.75λ;
Width of a guide 24, 25: 0.35λ;
Depth of a lateral cavity 52, 53, 53': 0.25λ;
Width of a lateral cavity 52, 53, 53': 0.12λ.

The distance between the aperture 51 of the guide and the apertures 54, 55, 54' of the cavities, on the one hand, and the interior face of the cylinder 21, on the other hand, may range from 0.1λ to 2λ. In the case of application with the radar 2 operating at 77 GHz, λ is about a few millimetres.

In the example in FIGS. 6a and 6b, the guide emits into the E component, the radiating aperture being produced on a short side of the guide.

FIG. 6b shows a preferred embodiment in which the guide 24 and the cavities 52, 53, 53' are produced in the interior cylinder 26. To this end, this cylinder may be made of metal. As for the waveguides 24, 25, the cavities 52, 53, 53' may be etched into the cylinder.

Figure 7:
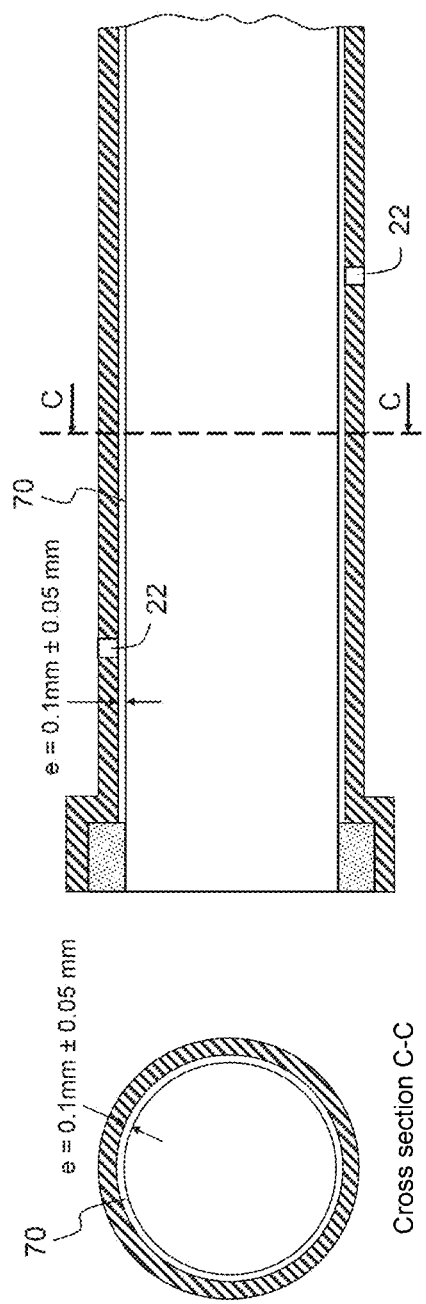
FIG. 7, a longitudinal cross-sectional view of said antenna.

FIG. 7 details, via a partial longitudinal cross-sectional view, one advantageous embodiment in which the space 70 between the stator 26 and the rotor 21 is very small, typically having a thickness e typically equal to 0.1 mm with a tolerance of ±0.05 mm.

The height of the scanner 1 is for example about 400 mm.

Figure 8A:
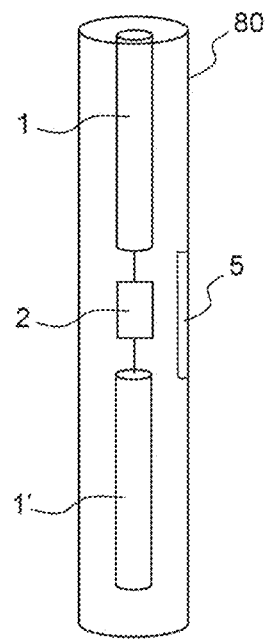
FIGS. 8a and 8b, an exemplary embodiment of a device according to the invention allowing a bi-static type operation.
Figure 8B:
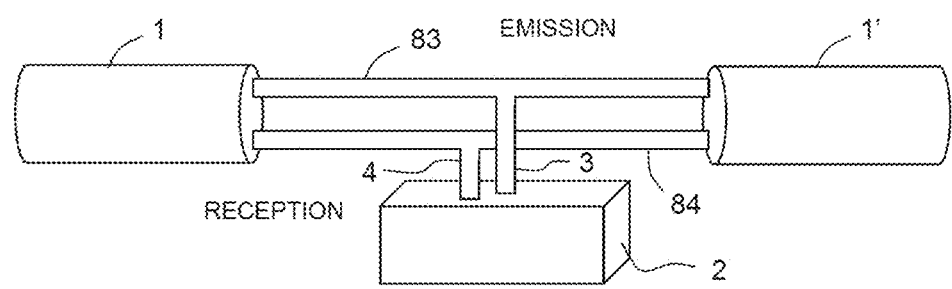

FIGS. 8a and 8b shows one embodiment of the device according to the invention allowing not only a conventional radar operating mode, but also a mono-static and a bi-static operating mode. To this end, the device includes two scanners 1, 1' of the same type as that illustrated by FIGS. 5a and 5b, the two scanners being connected to a radar 2 according to FIG. 8b. The two scanners 1, 1' are connected together by two waveguides 83, 84, one guide 83 connecting the emission guides 24 of the scanners and the other guide 84 connecting the reception guides 25 of the scanners.

The first guide 83 is connected via a magic T to the emission channel 3 connected to the radar. The second guide 84 is connected via another magic T to the reception channel 4 connected to the radar.

The two scanners and the radar are together placed in the interior of a cylindrical radome 80. The video camera 5 is fastened to this radome, between the two scanners 1, 1'.

Figure 9:
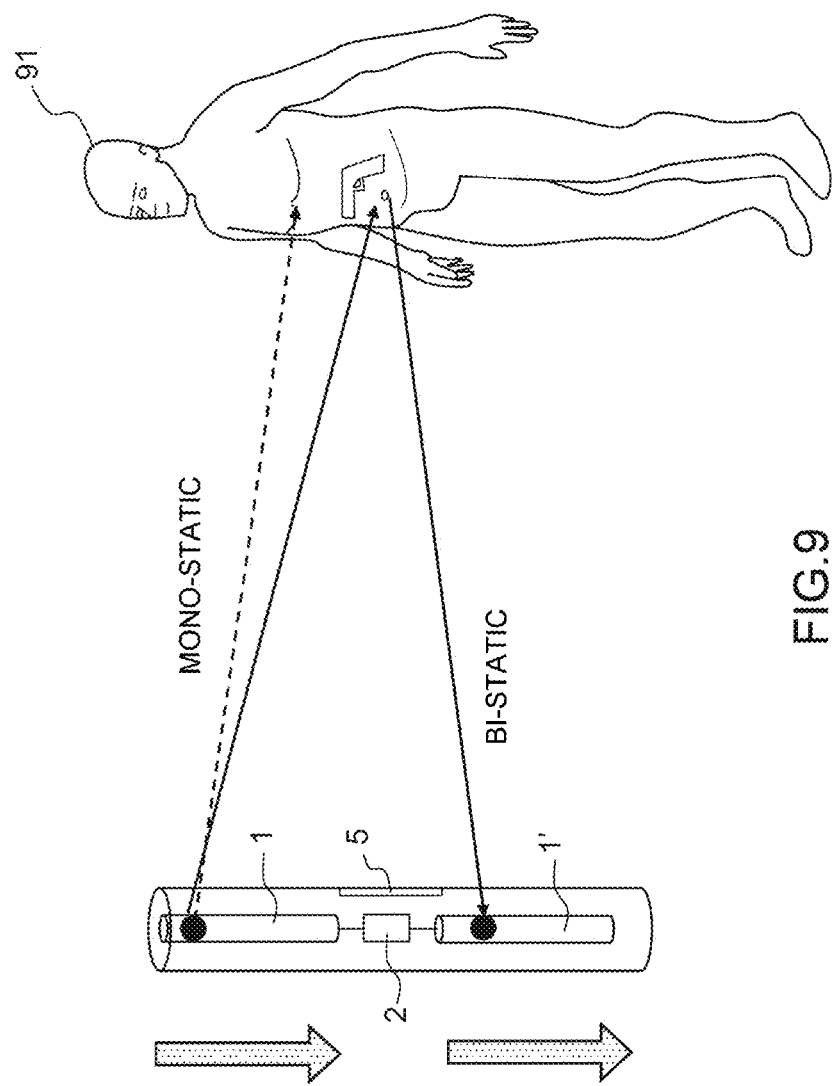
FIG. 9, an illustration of mono-static operation and an illustration of the bi-static operation.

FIG. 9 illustrates two operating embodiments of the device illustrated by FIGS. 8a and 8b. In the mono-static mode, a single scanner 1 is used, for the emission towards an individual 91 and for the reception. In the bi-static mode, the first scanner 1 performs the emission towards the individual and the second scanner 1' performs the reception of the signals reemitted by the individual.

The bi-static operating mode advantageously allows the quality of the radar image to be improved. The video camera 5 is oriented towards the individual in order to capture video images thereof.

Returning to FIG. 1, the formation of the radar images in combination with the stereoscopic video camera 5 will now be described. The radar may operate in mono-static mode or in bi-static mode.

The device according to the invention allows magnetic or non-magnetic objects hidden under the clothes of a stationary or moving person to be detected and imaged.

Advantageously, the video camera measures distances to the clothes and, since infrared light does not penetrate into clothes, allows an adaptive filter to be formed in order to obtain radar images of the objects and to determine their natures through the clothes.

It will be noted that in the absence of this video camera, the radar would not allow the various distances of body portions of moving individuals to be measured because it would be necessary to operate in a FMCW (frequency-modulated continuous-wave) operating mode at frequencies from 70 GHz to 110 GHz to achieve the desired precision, which is about one millimetre.

The two waveguides 3, 4 connect the antenna 1 to the radar 2. A first guide 3 transmits the emission wave to the antenna. This first waveguide 3 also transmits the reception signals from the antenna to the radar. The second guide 4 transmits the reception wave from the antenna to the radar, via a phase shifter that shifts the phase of the received signals by 90°. Thus, over the direct channel, using the first guide 3, the signals are transmitted without phase shift, delivering the direct component I(t) of the received signals whereas the second guide 4 delivers the quadrature component Q(t).

The components thus received are taken into account by the receiving and processing means of the radar 2 to compute the radar image obtained, this image being an SAR image as indicated above.

The image $Im(x_i, y_j)$ of a point $(x_i, y_j)$ may be formed as is known by integrating the received signals over an analysis time T. The image $Im(x_i, y_j)$ is then given by the following relationship:

$$Im(x_i, y_j) = \int_0^T (I(t) + iQ(t)) \cdot \exp\left[-i\frac{4\pi}{\lambda}(L(x_i, y_j, t)) - s(t)\right] \quad (1)$$

where $L(x_i, y_j, t)$ is the distance between the radiation source 11, 12 at the time t and the point of analysis $(x_i, y_j)$ on the individual, λ being the wavelength. The distances $I(x_i, y_j, t)$ are delivered by the video camera 5. s(t) is the distance between the centre of the emitting antenna and the video camera Advantageously, the video camera allows, around the targeted individual, a virtual envelope to be produced the distances of which to the device according to the invention are known. This virtual envelope in fact corresponds to the exterior surface of the clothes worn by the individual. It allows a reference surface to be obtained. The measurements carried out by the video camera in fact allow a mesh representing this surface to be obtained. The surface may be obtained by smoothing by computing a mean. This surface is computed at regular time intervals, for example every 20 ms, allowing each of the moving parts of the individual (arms, torso, legs, etc.) to be focused on.

The video camera, which may be an infrared video camera, having a retina formed from an array of CMOS sensors, measures the distance via the received power level. For example, with 12-bit coding the measurement precision may be 1 millimetre at a distance of one metre.

Figure 10:
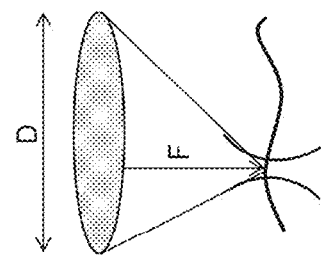
FIG. 10, an illustration of the detection of an object through an item of clothing.
Figure 10:
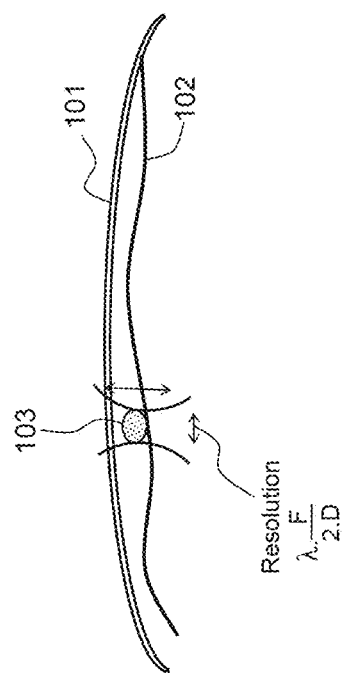

FIG. 10 illustrates the detection of an object 103 through an item of clothing 101, the object being fastened to the body 102 of the individual beneath the item of clothing 101. The distance of the item of clothing, and more particularly of points thereof, is measured and known by the device according to the invention, the clothing having been represented as the virtual surface such as described above. It is very important to obtain this envelope because it allows deformations of the clothing due to body movements to be tracked. Specifically, the video camera 5 allows the distance at given time intervals, for example every 20 ms, of all the moving parts of the body, and more precisely of the clothing envelope, to be measured. These distance measurements allow an adaptive filter to be formed for the image formation.

The image-forming process involves two steps: an acquiring step and a focusing step. In the acquiring step, the radar acquires the components I and Q of the above Equation (1). Given that radar signals pass through clothes, the acquired image is that of the body possibly equipped with an object 103. Determining the reflection coefficients of the received signals conventionally allows the nature of the parts of the image and in particular of the object 103 to be defined.

In the focusing step, the video camera allows the distances forming the argument of the exponential of the integral in Equation (1) to be defined and therefore the image to be calculated.

The resolution of the image is equal to $$\lambda \cdot \frac{F}{2D}.$$

The obtained image is given by Relationship (1). For each pixel x, y of the image, the following is calculated:

$$\sum (I(t) + iQ(t)) \cdot \exp\left[-i\frac{4\pi}{\lambda}(L(x_i, y_j, t)) - s(t)\right]$$

The part $$\exp\left[-i\frac{4\pi}{\lambda}(L(x_i, y_j, t)) - s(t)\right]$$

corresponding to the adaptive filter.

($L(x_i, y_j, t)$) is calculated for the virtual surface formed from a plurality of measurement points on the clothes, for each part of the body of the moving individual.

The noise caused by measurement imprecision is conventionally filtered by applying a moving window technique to the image.

The final image is obtained using Relationship (1) and is computed by the processor 6 from the image delivered by the radar, via the components I and Q, and from the image delivered by the video camera, the latter image allowing the argument of the exponential to be computed. In one possible embodiment, the processor 6 may be integrated into the radar 2. In particular, the function of the processor 6 may be provided by the processing means of the radar that process the I and Q components of the SAR image.

Once the final image has been obtained, objects may be recognised and classified by analysing:
their shapes;
their dielectric permittivities, which reveal their natures.

This recognition may be performed by the processor 6 or the processing means of the radar.

In one particular embodiment, the radar 2 emits at a plurality of frequencies close to a given frequency, 77 GHz for example. The radar 2 for example emits at five frequencies F1, F2, F3, F4, F5. In the measuring phase, the pulse is for example divided into five portions, the portions being successively emitted at F1, F2, F3, F4, F5. If the pulse lasts 200 μs, each portion then lasts 40 μs.

More generally, the radar emits in a continuous-wave (CW) mode, the emission pulse being divided into N portions, each portion corresponding to one frequency. Below, the example where N is equal to 5 will continue to be considered.

Figure 11:
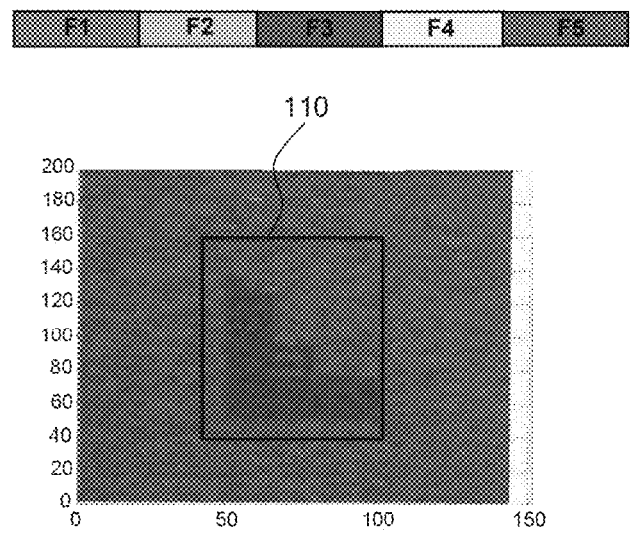
FIG. 11, a detection zone subjected to the analysis of a multifrequency signal.

In the analysis phase, phases and amplitudes are for example calculated for all the frequencies. A first analysis at the first frequency F1 is carried out for all of the body. Then a second analysis is carried out in a limited zone 110 containing a detected shape, with the four other frequencies F2, F3, F4, F5, as illustrated in FIG. 11. These various analyses allow the theoretical value of the dielectric permittivity of the object and its thickness to be approached.

By way of example, it is possible to achieve measured values of 2.9 and 11 mm for the dielectric permittivity and thickness for theoretical values of 3.1 and 10 mm, respectively.

Figure 12:
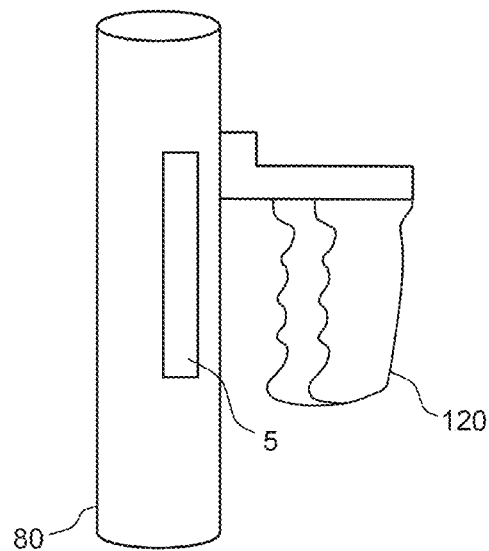
FIG. 12, an exemplary embodiment of a portable device according to the invention.

FIG. 12 shows an exemplary embodiment of a portable device according to the invention. The antennal portion, which consists of one or two scanners 1, 1', the radar 2 and their interconnecting means 3, 4, 83, 84 are placed in the interior of a cylindrical structure that also plays the role of a radome 80. This structure moreover supports the video camera 5. The structure 80 is connected to a handle 120, allowing a light portable device that is easy to handle to be obtained. Its production cost may be low because of the type of components used; in particular, the radar 2 may be an economical traffic radar and the video camera may be a Kinect, which is likewise economical. The components making up the interior scanner (cylinders, waveguides, motor and ball bearings) are also economical.

Thus, a device allowing illicit objects to be detected by detecting their shapes through clothing and by characterizing the materials from which they are made is obtained. It may be used while mobile. Detection is easy, the device need only be pointed at about one metre from an individual to be inspected.

The detecting device is connected to viewing means by a suitable wireless link. The viewing means 7 may be a screen in a control centre or be close at hand to the user handling the device. The viewing means may also be glasses worn by the user and onto which the detected images are projected.

It is possible to make provision for a second stereoscopic video camera in order to improve the field of view.

Figure 13:
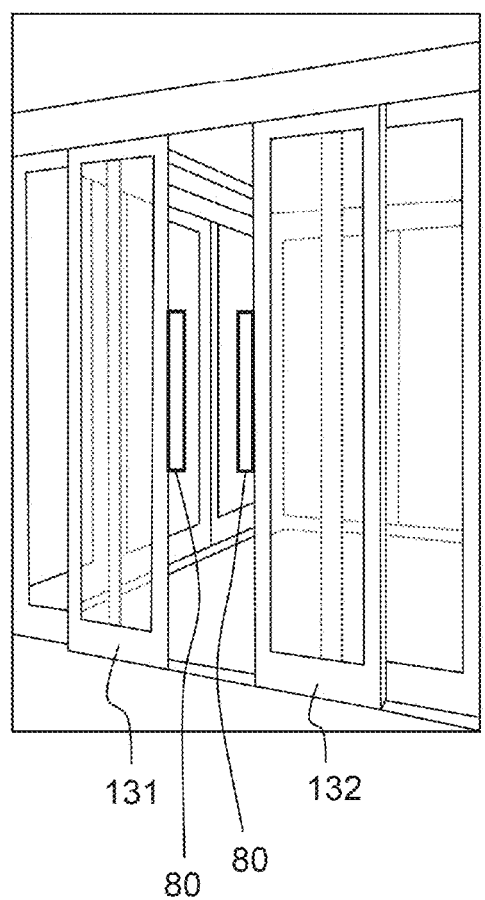
FIG. 13, an example of application of devices according to the invention equipping doors for the inspection of a passageway.

FIG. 13 shows another exemplary use of a device according to the invention with another "packaging". The inspection system here is applied level with doors 131, 132 that open automatically. Four devices according to the invention may be used, the radomes 80 of two of which may be seen in the figure. For each door, one device is placed towards the exterior and one device is placed towards the interior, each device being placed as close as possible to the opening. As in the example in the preceding figure, an individual or a moving object may be inspected from all angles. A viewing screen, which is common to the four devices, is placed remotely.

The preceding exemplary embodiments show that the invention improves the fluidity of inspections, in particular in places of public circulation and congregation, such as for example airports, train stations or shopping centres or other public places.

The invention claimed is:

1. A device for detecting objects borne by immobile or moving individuals, comprising:
    first and second rotary antennas, each including at least two parallel rectilinear waveguides, one of the two waveguides being an emission guide that is configured to transmit an emission wave and the other of the two being a reception guide that is configured to transmit a reception wave, and a movable cylinder provided with a helicoidal slot rotatably movable about said waveguides, the waveguides being open facing an interior face of said movable cylinder, said interior face forming a microwave short-circuit in order to close said waveguides, a movable radiating source being located facing said waveguides subsequent to the rotational movement of said moveable cylinder inducing a movable emission and reception beam able to be oriented in a direction towards an individual;
    one radar configured to emit the emission wave, which is a continuous wave microwave signal, towards the emission guide of said first antenna and to receive signals captured by said movable beam from the waveguides of said second antenna, said received signals including a direct component I and a quadrature component;
    one stereoscopic video camera that is configured to be oriented in the direction towards the individual and able to record a clothing envelope of said individual, said clothing envelope being a reference surface defined by measurements of distances between an item of clothing of said individual and said device; and
    one processor configured to compute a synthetic aperture radar image of a portion of the body of said individual which is targeted by said radar and said video camera and who is possibly equipped with one or more objects, from signals received from said radar and from the clothing envelope recorded by said video camera,
    wherein said radar is configured to operate in a bi-static mode, said first rotary antenna realizing emission and said second rotary antenna being dedicated to reception.

2. The device according to claim 1, wherein the two waveguides are etched into an interior cylinder that is disposed in an interior of the movable cylinder, the two cylinders having a same axis, a space between the two cylinders is equal to 0.1 mm±0.05 mm.

3. The device according to claim 1, wherein said rotary antennas include a system for minimizing microwave leaks, said system being composed of three cavities, said cavities being arranged pairwise on each side of said waveguides, parallel thereto, over all their length.

4. The device according to claim 1, wherein said waveguides are etched into an interior cylinder that is disposed in an interior of the movable cylinder, said movable cylinder is rotatably movable by way of a ball bearing device, a base of said movable cylinder and a base of said interior cylinder being mechanically secured to a movable portion and a stationary portion of said ball bearing device, respectively.

5. The device according to claim 1, wherein said radar is configured to operate in a millimetre-wave frequency band.

6. The device according to claim 1, wherein the antennae are connected together by two additional waveguides including a first waveguide that connects the emission guides of said antennae and a second waveguide that connects the reception guides, the first waveguide being connected via a magic T to the radar and the second waveguide being connected via another magic T to the radar.

7. The device according to claim 1, wherein
    said radar emits at a number N of frequencies, and
    said processor being configured to perform objects classification by:
        performing a first level of analysis of the image for signals received at a first of said frequencies; and
        performing other analyses for signals received at other frequencies of said frequencies.

8. The device according to claim 1, wherein the processor is an integral part of said radar.

9. The device according to claim 1, comprising a viewer for viewing the obtained images, said viewer being glasses worn by a user and onto which said images are projected.

10. The device according to claim 1, wherein the first and second antennas and the radar are provided in an interior of a portable cylindrical radome, and said radome supports said video camera.

* * * * *